United States Patent
Borenstein et al.

(10) Patent No.: US 8,736,805 B2
(45) Date of Patent: May 27, 2014

(54) LIQUID CRYSTAL MIRROR ADAPTED TO FILTER LIGHT IN THE MESOPIC WAVELENGTH REGION

(75) Inventors: Yehuda Borenstein, Misgav (IL); Bahman Taheri, Kent, OH (US)

(73) Assignee: Alphamirror Inc., Kent, OH (US)

( * ) Notice: Subject to any disclaimer, the term of this patent is extended or adjusted under 35 U.S.C. 154(b) by 1304 days.

(21) Appl. No.: 11/922,932

(22) PCT Filed: Jun. 20, 2006

(86) PCT No.: PCT/IL2006/000713
§ 371 (c)(1),
(2), (4) Date: Dec. 27, 2007

(87) PCT Pub. No.: WO2007/034469
PCT Pub. Date: Mar. 29, 2007

(65) Prior Publication Data
US 2009/0109393 A1    Apr. 30, 2009

Related U.S. Application Data

(60) Provisional application No. 60/718,720, filed on Sep. 21, 2005.

(51) Int. Cl.
*G02F 1/13* (2006.01)
*G02F 1/1335* (2006.01)

(52) U.S. Cl.
USPC .............. 349/195; 349/113; 349/193

(58) Field of Classification Search
USPC ......... 349/1, 113, 95, 193–195; 359/265–275
See application file for complete search history.

(56) References Cited

U.S. PATENT DOCUMENTS

| | | | |
|---|---|---|---|
| 4,299,444 A | 11/1981 | Romer | 350/278 |
| 4,632,509 A | 12/1986 | Ohmi et al. | 350/283 |
| 4,664,479 A * | 5/1987 | Hiroshi | 349/195 |
| 4,917,477 A | 4/1990 | Bechtel et al. | 350/357 |
| 5,115,346 A * | 5/1992 | Lynam | 359/604 |
| 5,469,296 A | 11/1995 | Ohno et al. | |
| 5,521,744 A | 5/1996 | Mazurek | 359/267 |
| 5,708,410 A | 1/1998 | Blank et al. | 340/438 |

(Continued)

FOREIGN PATENT DOCUMENTS

| | | | |
|---|---|---|---|
| EP | 0614784 | 9/1994 | |
| WO | WO 02/41049 | 5/2002 | |
| WO | WO 2007/034469 | 3/2007 | |
| WO | WO 2013/116460 A1 | 8/2013 | G02B 27/28 |

OTHER PUBLICATIONS

International Preliminary Report on Patentability Dated Apr. 3, 2008 From the International Bureau of WIPO Re.: Application No. PCT/IL2006/000713.

(Continued)

*Primary Examiner* — Dung Nguyen
(74) *Attorney, Agent, or Firm* — Renner Kenner Greive Bobak Taylor & Weber

(57) ABSTRACT

A mirror system, comprising a spectrally selective liquid crystal reflective assembly, designed and constructed to substantially absorb or transmit light at wavelengths corresponding to mesopic conditions, while reflecting light at other wavelengths. In one embodiment, the reflectance level of the mirror system is altered in response to a voltage applied across the selective liquid crystal reflective assembly.

28 Claims, 8 Drawing Sheets

(56) References Cited

U.S. PATENT DOCUMENTS

| | | | | |
|---|---|---|---|---|
| 5,808,778 | A * | 9/1998 | Bauer et al. | 359/267 |
| 6,008,871 | A | 12/1999 | Okumura | 349/61 |
| 6,317,180 | B1 | 11/2001 | Kuroiwa et al. | 349/96 |
| 6,359,670 | B1 | 3/2002 | Broer et al. | 349/115 |
| 6,759,945 | B2 | 7/2004 | Richard | 340/179 |
| 7,379,243 | B2 | 5/2008 | Horsten et al. | 359/501 |
| 7,656,586 | B2 | 2/2010 | Rosario et al. | 359/633 |
| 2005/0007506 | A1 | 1/2005 | Faris et al. | 349/16 |
| 2006/0244882 | A1 | 11/2006 | Watson et al. | 349/98 |
| 2007/0041096 | A1 | 2/2007 | Nieuwkerk et al. | 359/483 |
| 2007/0183037 | A1 | 8/2007 | De Boer et al. | 359/487 |
| 2008/0068520 | A1 | 3/2008 | Minikey, Jr. et al. | 349/11 |
| 2008/0131138 | A1 | 6/2008 | Futami et al. | 398/152 |
| 2008/0205076 | A1 * | 8/2008 | Taheri et al. | 362/494 |
| 2009/0284670 | A1 | 11/2009 | Xue | 349/16 |

OTHER PUBLICATIONS

International Search Report mailed Sep. 28, 2006 in corresponding application No. PCT/IL2006/000713.
Written Opinion mailed Sep. 28, 2006 in corresponding application No. PCT/IL2006/000713.
International Preliminary Report on Patentability mailed Mar. 26, 2008 in corresponding application No. PCT/IL2006/000713.
International Search Report mailed Feb. 12, 2007 in corresponding application No. PCT/IL2006/000431.
International Search Report mailed Apr. 19, 2013 in corresponding application No. PCT/US2013/024044.
Written Opinion mailed Apr. 19, 2013 in corresponding U.S. Appl. No. PCT/US2013/024044.
Office Action mailed Jul. 1, 2010 in corresponding U.S. Appl. No. 11/910,875.
Response to Office Action of Jul. 1, 2010 as filed in corresponding U.S. Appl. No. 11/910,875.
Office Action mailed Oct. 4, 2012 in corresponding U.S. Appl. No. 11/910,875.
Response to Office Action of Oct. 4, 2012 as filed in corresponding U.S. Appl. No. 11/910,875.
RCE as filed in further Response to Office Action of Oct. 4, 2012 in corresponding U.S. Appl. No. 11/910,875.
Office Action mailed Apr. 22, 2013 in corresponding U.S. Appl. No. 11/910,875.
Response to Office Action of Apr. 22, 2013 as filed in corresponding U.S. Appl. No. 11/910,875.

* cited by examiner

| Ambient Light | Day | Twilight\light street | | | Dark road with cars | | | Complete darkness | | |
|---|---|---|---|---|---|---|---|---|---|---|
| Glare | 10000lux N/A | 20Lux | 5Lux | 0.5Lux | 1Lux | 0.1Lux | | | 0.1Lux Or Less | |
| Reflectance | CLEAR | 86Lux Maximum Darken <10% | 2Lux 10%-50% | Clear | 86Lux 3Lux 1Lux Maximum Dark <10% | 0.1Lux 10%-50% | | 10Lux 3Lux 1Lux Maximum Dark <10% | 0.03Lux 10%-50% | 0.01 Lux Clear |
| Response Darken | N/A | 1U per 0.5s | 1U per 1s | | 1U per 0.125s | 1U per 0.25s | 1U per 0.5s | 1U per 0.125s | 1U per 0.25s | 1U per 0.5s 1U per 0.5s |
| Response Brightness | N/A | 1U per 1s + 2s start delay | | | 1U per 1s + 2s start delay | | | 1U per 1s + 2s start delay | | |

Fig. 8

LIQUID CRYSTAL MIRROR ADAPTED TO FILTER LIGHT IN THE MESOPIC WAVELENGTH REGION

RELATED APPLICATIONS

This Application is a National Phase of PCT Patent Application No. PCT/IL2006/000713 having International Filing Date of Jun. 20, 2006, which claims the benefit of U.S. Provisional Patent Application No. 60/718,720 filed on Sep. 21, 2005. The contents of the above Applications are all incorporated herein by reference.

FIELD AND BACKGROUND OF THE INVENTION

The present invention relates to a liquid crystal mirror and, more particularly, to a mesopic-free liquid crystal mirror.

Vehicles generally include an interior rearview mirror and two side exterior rearview mirrors. The rearview mirrors allow the driver to view scenes behind the vehicle without having to face in a rearward direction and to view areas around the vehicle that would otherwise be blocked by the vehicle structure. As such, rearview mirrors are an important source of information to the driver. Bright lights appearing in a scene behind the vehicle, such as from another vehicle approaching from the rear, may create glare in a rearview mirror that can temporarily visually impair or dazzle the operator. This problem is only aggravated under low ambient light conditions such as at night, when the eyes of the driver have adjusted to the darkness.

Various solutions have evolved to deal with the problem of glare in rearview mirrors of vehicles. One conventional solution to this problem, used primarily with interior, center-mounted rear view mirrors, is to employ a prismatic mirror with a switch lever on the mirror housing.

The switch can be manually moved between a daytime position, providing direct, normal intensity reflection from the mirror surface, and a night time position providing a reduced intensity reflection. When the driver experiences glare, he manually changes the rearview mirror setting to low reflectivity. With the low intensity of light reflected to the driver, the intensity of reflected headlights from trailing vehicles is insufficient to impair the driver's vision. Once the glare is subsided the driver can manually switch the rearview mirror back to high reflectivity. Difficulties with manually controlled mirrors include the glare experienced before the mirror could be switched as well as driver distraction caused by finding and operating the switch lever.

Another solution is the use of mirrors which absorb yellow light and reflect light in all other visible colors, i.e., from red to orange and from green to purple (to this end see, e.g., U.S. Pat. Nos. 5,075,674 and 5,844,721). The motivation for manufacturing this type of mirror is the belief that yellow light is the source of most visual discomfort to the driver. The exclusion of yellow light is typically achieved using Neodymium Oxide, a rare earth oxide, either as a separate film within the mirror or as a dopant applied to the glass of the mirror.

However, at night, when the rods in the human visual system are dominant, there is a high sensitivity of the human visual system to the blue and near blue light. Therefore, although exclusive absorption of yellow light reduces glare discomfort, such technique is still far from being satisfactory because there is a considerable contribution of other colors of the spectrum to glare.

Also known in the art are automatically dimming rearview mirrors which eliminate the need for the operator to manually switch the mirror.

Early designs of such automatically dimming mirrors included a single glare sensor facing rearward to detect the level of light striking the mirror. This design, however, has been proved to be inadequate since the threshold perceived by the driver for dimming the mirror, known as the glare threshold, varies as a function of the ambient light level. An improved design is a dual sensor automatically dimming mirror which includes a second light sensor for detecting the ambient light level. The glare threshold in these systems is based on the amount of ambient light detected. Another related approach includes an imaging array which gathers light from behind and beside the vehicle. Ambient light is detected by examining pixels generally looking sideways. The cost of such a systems is, however, prohibitively expensive for many automotive applications.

Improvements in glare reduction additionally occurred when prismatic mirrors having two states were replaced with multi-state mirrors which include dimming elements capable of providing many levels of reflectivity reduction. One type of such multi-state mirrors automatically dimming rearview mirrors is based on the well known Stark effect, named after the German physicist and Nobelist Johannes Stark (1874-1957). According to the Stark effect, there is a splitting or shift of the spectral lines of atoms when present in an external electric field. The Stark effect is also referred to in the literature as the electrochromic effect and the automatically dimming rearview mirrors are commonly termed electrochromic mirrors.

An electrochromic mirror includes an electrochromic medium connected between two electrodes. Under the principles of the Stark effect, the electrochromic medium is responsive to external electric field generated by electrodes. When a sufficient electrical potential difference is applied across the electrodes of the automatically dimming rearview mirror the electrochromic medium enters a translucent state by changing its spectral characteristics. Typical electrochromic mirrors are described in many U.S. patents (to this end see, U.S. Pat. Nos. 4,902,108, 5,724,187, 5,679,283, 5,725, 809).

WO/26633 teaches an electrochromic mirror assembly, formed of transparent semi-conductive layers and a reflective conductive layer. When no voltage is applied, the mirror is spectrally unselective in photopic reflectivity. The mirror exhibits a spectrally selective transmission characteristic, established by the refractive indices and physical thicknesses of the semi-conductive and conductive layers. When a voltage is applied across the mirror, the mirror exhibits a spectrally selective transmission characteristic. A display, controllable by application of voltage, is positioned within the assembly such that when a voltage is applied, the display emits light which is transmitted through the layers, being viewable by the driver.

Prior art electrochromic mirrors suffer from many limitations such as slow response rate, and high cost.

Other known automatically dimming mirrors make use of the properties of liquid crystals which are normally transparent to light but which when subjected to an electric field beyond a certain threshold, present a state of molecular realignment which is visibly different from the normal transparent state. While being in the molecular realignment state the light reflected from the mirrors is attenuated to a degree which is proportional to the applied electric field. Upon suppressing the applied electric field, the liquid crystal returns to the normal transparent state. Using such mirrors, therefore, it is possible to obtain selectively a high or a low reflecting power, according to whether the electrical voltage applied to the liquid crystal is lower or greater than the threshold.

Typical automatically dimming liquid crystal mirrors are found, e.g., in U.S. Pat. Nos. 4,660,937, 4,589,735 and 4,200,361. These and other prior art liquid crystal mirrors are costly, technologically difficult to employ, or otherwise suffer from poor performances.

The present invention provides solutions to the problems associated with prior art automatic dimming techniques.

SUMMARY OF THE INVENTION

According to one aspect of the present invention there is provided a mirror system. The mirror system comprises a spectrally selective liquid crystal reflective assembly, designed and constructed to substantially absorb or transmit light at wavelengths corresponding to mesopic conditions, while substantially reflecting light at other wavelengths.

According to further features in preferred embodiments of the invention described below, the liquid crystal reflective assembly comprises a liquid crystal medium being characterized by an absorption curve having a peak at a wavelength of about 520 nanometers and a half width at half max of about 50 nanometers.

According to still further features in the described preferred embodiments the liquid crystal reflective assembly comprises a liquid crystal medium capable of at least partially absorbing light at wavelengths of from about 490 nanometers to about 550 nanometers, while substantially reflecting light at other wavelengths.

According to still further features in the described preferred embodiments the liquid crystal reflective assembly is responsive to voltage in a manner such that when a the voltage is applied across the liquid crystal reflective assembly, a reflectance level of the liquid crystal reflective assembly is altered.

According to still further features in the described preferred embodiments the system further comprises an electronic circuitry for varying a level of the voltage at a predetermined rate, thereby altering a reflectance level of the liquid crystal reflective assembly at the predetermined rate.

According to still further features in the described preferred embodiments the electronic circuitry is designed and configured to receive ambient light information and rear light information, and to select the level of the voltage and the predetermined rate based on the ambient light information, the rear light information or a combination thereof.

According to still further features in the described preferred embodiments the system further comprises an ambient light sensor for collecting and transmitting the ambient light information to the electronic circuitry, and a rear light sensor for collecting and transmitting the rear light information to the electronic circuitry.

According to still further features in the described preferred embodiments the system further comprises a user interface communicating with the electronic circuitry.

According to still further features in the described preferred embodiments the electronic circuitry is designed and configured to receive from the user interface a characteristic response information of a user to light and to weight the predetermined rate based on the characteristic response information.

According to still further features in the described preferred embodiments the electronic circuitry is designed and configured to vary the level of the voltage at a continuous or step-wise varying rate.

According to still further features in the described preferred embodiments the system serves as a rearview mirror of a vehicle. According to still further features in the described preferred embodiments the system serves as an interior rearview mirror of a vehicle. According to still further features in the described preferred embodiments the system serves as an exterior rearview mirror of a vehicle.

According to still further features in the described preferred embodiments the ambient and/or rear light information comprises light illuminance information. According to still further features in the described preferred embodiments the ambient and/or rear light information comprises light brightness information. According to still further features in the described preferred embodiments the ambient and/or rear light information comprises light spectral information.

According to still further features in the described preferred embodiments the predetermined rate is selected from a set of discrete rates, each rate of the set of discrete rates corresponding to a different ambient and/or rear light condition.

According to still further features in the described preferred embodiments each rate of the set of discrete rates corresponds to a different illuminance range of the ambient and/or rear light.

According to still further features in the described preferred embodiments each rate of the set of discrete rates corresponds to a different brightness range of the ambient and/or rear light.

According to still further features in the described preferred embodiments the predetermined rate is a monotonic decreasing function of an illuminance of the ambient and/or rear light.

According to still further features in the described preferred embodiments the predetermined rate is a monotonic decreasing function of a brightness of the ambient and/or rear light.

The present invention successfully addresses the shortcomings of the presently known configurations by providing a automatic dimming liquid crystal mirror system enjoying properties far exceeding the prior art.

Unless otherwise defined, all technical and scientific terms used herein have the same meaning as commonly understood by one of ordinary skill in the art to which this invention belongs. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 8 is a diagram representing the variation rate of the mirror system according to a preferred embodiment of the present invention, for different ambient light conditions.

DESCRIPTION OF THE PREFERRED EMBODIMENTS

Figure 1A:
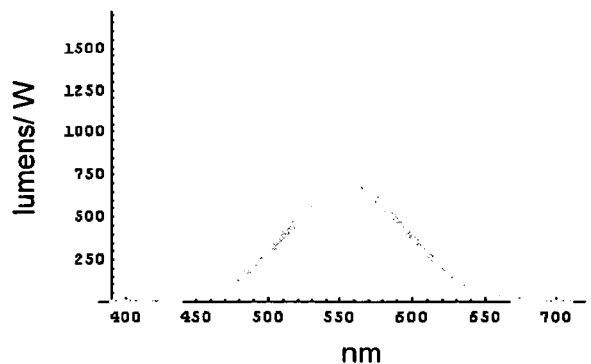
FIG. 1a shows a typical efficacy curve for photopic vision.

The present invention is of a system which can be used in vehicles rearview mirrors. Specifically, the present invention can be used to selectively reflect light thereby to reduce glare in vehicles rearview mirrors.

The principles and operation of a system and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As stated in the Background section above, the prior art attempts to reduce glare in rearview mirrors, are directed at absorbing the yellow portion of the reflected light, or altering the overall reflectance level of the mirrors, either automatically or manually. These techniques, however, are not adapted to provide the physiological visual system the maximal comfort. In a search for an effective technique for reducing discomfort during night driving, the present inventors have uncovered that a significant amount of the glare discomfort can be reduced using a mirror which absorbs the portion of the spectrum to which the human visual system is most sensitive.

The human retina consists of several layers of cells of which the receptors are responsible for the beginning of the visual process. There are two types of receptors: the rods, generally activated by dim and monochromatic light, and cones, generally activated by bright and chromatic light. There are 3 types of cones, each most sensitive to a certain wavelength of light: short (about 430-440 nm), medium (about 535-540 nm) and long (about 560-565 nm). There is, on the other hand, only one type of rod, which does not detect color. The rod is most sensitive to the light wavelength of about 500 nm.

The term "about", as used throughout the specification refers to ±10%, and more preferably ±5%.

The sensitivity of the human vision system to light is typically illustrated using an efficacy curve which describes the efficacy of the vision system as a function of the wavelength. At daylight, the cones are the dominant receptors, and the efficacy curve of the vision system has an efficacy peak of about 683 lumens per watt at a wavelength of about 555 nm, corresponding to greenish-yellow light.

Referring now to the drawings, a typical efficacy for vision in daylight is shown in FIG. 1a. The adaptation of the vision systems to the efficacy curve of FIG. 1a is referred to in the literature as photopic vision, and the corresponding lighting conditions are commonly termed photopic conditions.

Figure 1B:
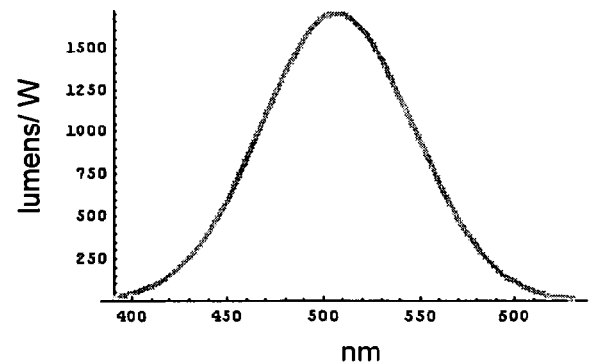
FIG. 1b shows a typical efficacy curve for scotopic vision.

At night, the rods are the dominant receptors, and the efficacy curve of the vision system has an efficacy peak of about 1700 lumens per watt at a wavelength of about 507 nm, corresponding to green-blue light. A typical efficacy for vision at nigh is shown in FIG. 1b. The adaptation of the vision systems to the efficacy curve of FIG. 1b is referred to in the literature as scotopic vision, and the corresponding lighting conditions are commonly termed scotopic conditions.

Figure 1C:
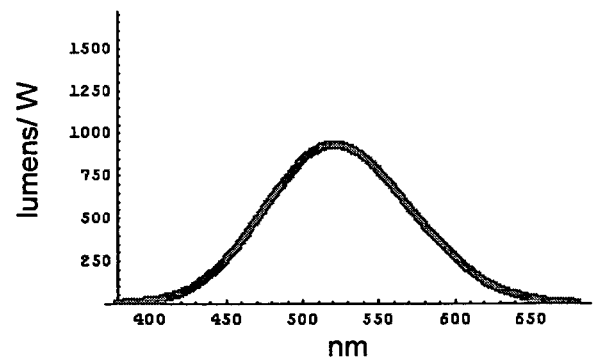
FIG. 1c shows a weighted average (40% scotopic and 60% photopic) of the curves of FIGS. 1a and 1b.

While conceiving the present invention it was realized by the present inventors that most driving conditions, in which the driver may experience glare discomfort are in partially illuminated roads or at twilight when the lighting is brighter than dark night, yet dimmer than full daylight. The efficacy curve of the vision system under such lighting condition is the combination of the photopic and scotopic efficacy curves. FIG. 1c shows a weighted average (40% scotopic and 60% photopic) of the curves of FIGS. 1a and 1b. The adaptation of the vision system to the combination of the photopic and scotopic efficacy curves (e.g., the curve of FIG. 1c) is referred to in the literature as mesopic vision, and the corresponding lighting conditions are commonly termed mesopic conditions.

Figure 1D:
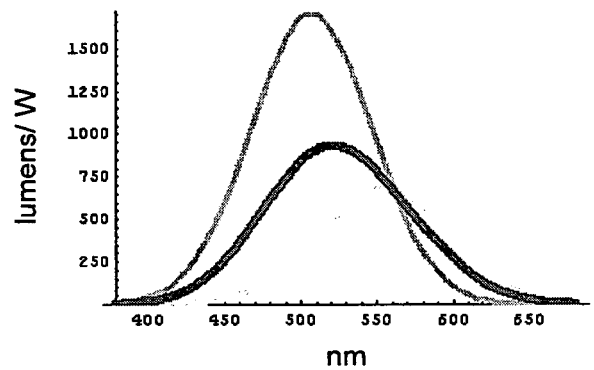
FIG. 1d shows the curves of FIGS. 1a-c on the same plot.

FIG. 1d shows typical photopic, scotopic and mesopic curves on the same plot to allow the reader to compare between the three efficacies of the human vision system.

Thus, according to one aspect of the present invention there is provided a mirror system 10, adapted for mesopic vision. Specifically, mirror system 10, in the darkened state, substantially absorbs light at wavelengths corresponding to mesopic conditions, while reflecting light at other wavelengths. Mirror system 10 can be used, for example, as an interior or exterior rearview mirror of a vehicle.

Figure 2:
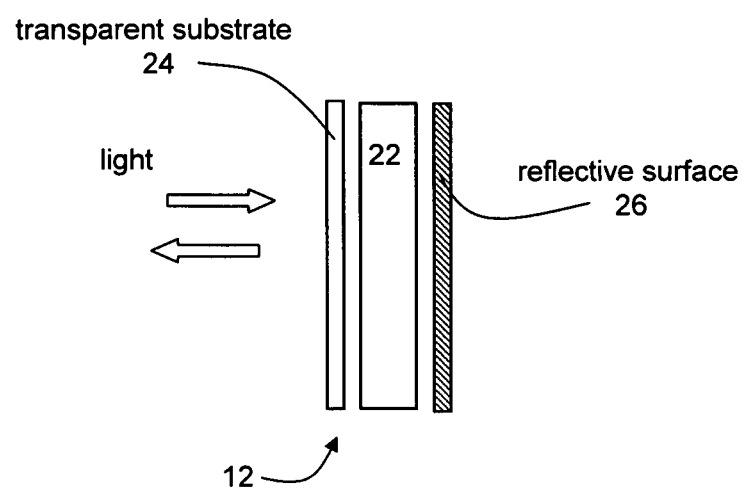
FIG. 2 is a schematic illustration of a mirror system adapted for mesopic vision, according to various exemplary embodiments of the present invention.

Reference is now made to FIG. 2, which is a schematic illustration of system 10. Mirror 10 preferably comprises a spectrally selective liquid crystal reflective assembly 12.

Assembly 12 can be formed of a liquid crystal medium 22 held between a transparent substrate 24 and a reflective surface 26. Liquid crystal medium 22 serves as a spectrally selective transmissive element. When activated, light impinging on assembly 22 through transparent substrate 24 is transmitted by substrate 24 and is partially absorbed by medium 22. The remnant portion of the light passes through medium 22 and impinges on surface 26, where it experiences a reflection. Subsequently, the light passes a second time through medium 22 (where it can be partially absorbed), and exits through surface 24.

The advantage of using a liquid crystal medium for the mirror system is that liquid crystals can be tailored to selectively absorb a desired portion of the spectrum, while transmitting all other portions. Thus, in various exemplary embodiments of the invention medium 22 substantially absorbs light at wavelengths corresponding to the mesopic conditions and transmits light at other wavelengths. This can be done, for example, by selecting the absorption characteristics of liquid crystal medium 22 in accordance with the typical mesopic curve shown in FIG. 1c. A representative example of such absorption characteristics is shown in FIG. 3.

Figure 3:
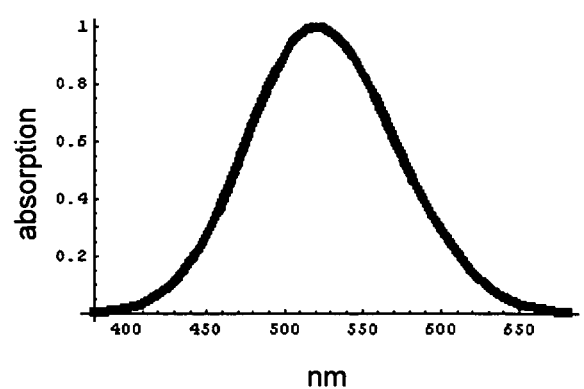
FIG. 3 shows a representative example of the absorption characteristics of the mirror system, according to various exemplary embodiments of the present invention.

In the preferred embodiment shown in FIG. 3, the absorption curve of medium 22 has a peak at a wavelength of about 520 nanometers and a half width at half max of about 50 nanometers. This curve is in accordance with the efficiency curve of the mesopic vision shown in FIG. 1c, obtained, as stated by a weighted average of 40% scotopic efficacy and 60% photopic efficacy. It is to be understood that other combinations of the scotopic and photopic efficacy curves are not excluded from the scope of the present invention. Generally, denoting the photopic efficacy by $e_p(\lambda)$ and the scotopic efficacy by $e_s(\lambda)$, where $\lambda$ is the wavelength of the light, the mesopic efficacy, $e_m(\lambda)$, is preferably obtained by the combination $e_m(\lambda)=p\ e_p(\lambda)+(1-p)e_s(\lambda)$, where p is a parameter, $p<1$. Preferred values for p are from 0.2 to 0.8, more preferably from 0.5 to 0.8, even more preferably from 0.5 to 0.7 (in the curve shown in FIG. 1c, for example, p=0.6).

In any event, the absorption curve of medium 22 preferably has a peak at a wavelength of 510-530 nanometers. From subjective vision standpoint, such absorption curve typically corresponds to a brownish color, where the dominance of the brown color may vary depending on the location of the peak and the width of the curve. The width of the absorption curve is preferably about 40 nanometers, more preferably about 30 nanometers, even more preferably about 20 nanometers.

The wavelengths of light which are substantially absorbed by medium 22 (e.g., by absorbance coefficient of 0.6 or above), are referred to herein as the "mesopic spectrum".

The wavelengths of light which are transmitted (e.g., by transmittance coefficient of 0.6 or above) by medium 22, are referred to herein as "non-mesopic spectra".

In various exemplary embodiments of the invention, the mesopic spectrum includes wavelengths of from about 490 nanometers to about 550 nanometers and the non-mesopic spectra include wavelengths below about 490 nanometers and above about 550 nanometers.

Figure 4:
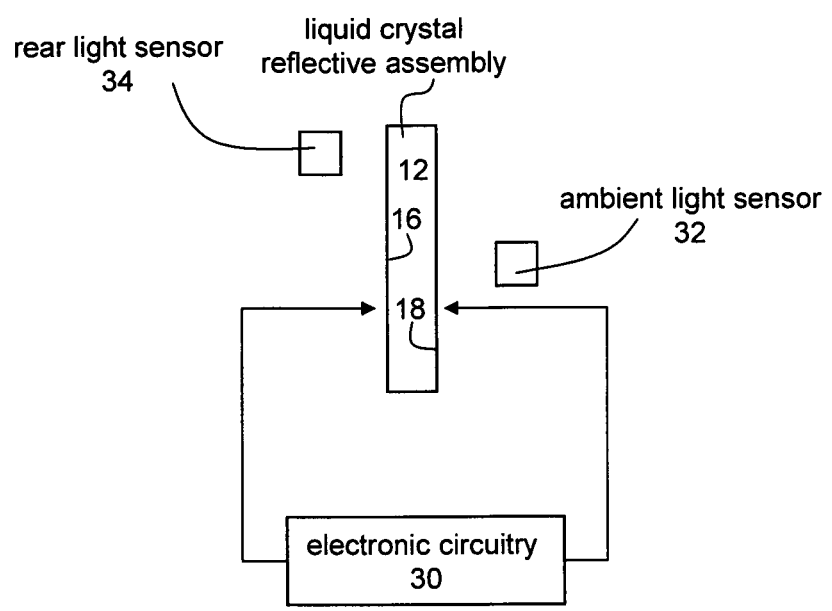
FIG. 4 is a schematic block diagram of an automatic dimming mirror system, according to various exemplary embodiments of the present invention.

Reference is now made to FIG. 4 which illustrates system 10, according to a preferred embodiment of the present invention. In this embodiment, assembly 12 has a variable reflectivity. Such liquid crystal reflective assemblies are known in the art (to this end see, e.g., U.S. Pat. Nos. 5,841,496, 6,144,430, 6,717,639 and 6,784,956) and typically operate in a similar manner to liquid crystal displays.

Figure 5A:
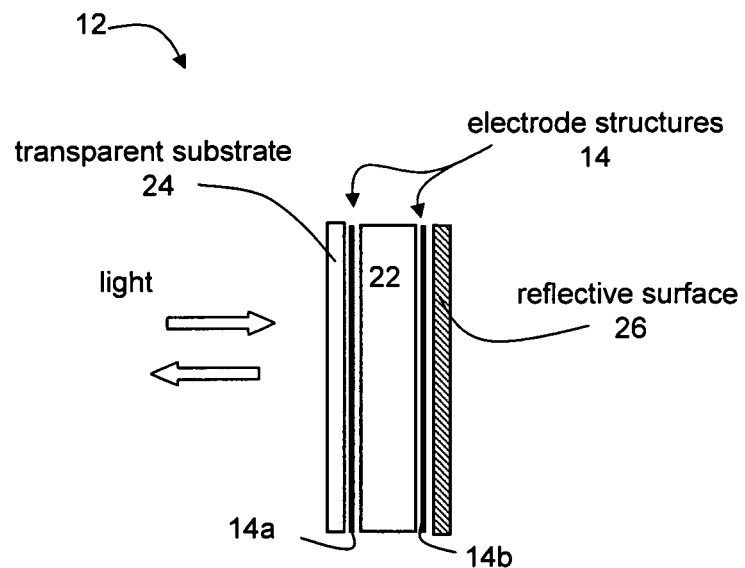
FIG. 5a is a schematic block diagram of a liquid crystal reflective assembly having a liquid crystal medium, according to various exemplary embodiments of the present invention.
Figure 5B:
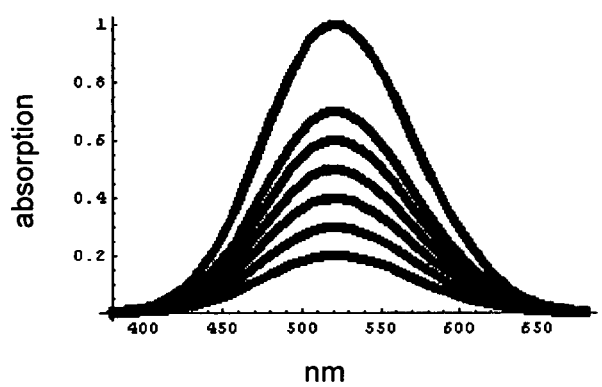
FIG. 5b shows several representative examples of absorption curves for the liquid crystal medium, in various exemplary embodiments of the invention.

For example, in one embodiment, schematically illustrated in FIG. 5a, liquid crystal medium 22 serves as a variable and selective transmissive element with several operation modes. The operation modes can be described either in terms of transmission curve or in terms of the complementary absorption curve. Herein, the different operation modes of medium 22 are conveniently characterized by different absorption curves. Preferably, all absorption curves have a peak located at the same wavelength but different values of absorption coefficient. Several representative examples of absorption curves are shown in FIG. 5b. As shown, medium 22, when activated, absorbs, at a variable absorption coefficient, light in the mesopic spectrum, while substantially transmitting light at the non-mesopic spectra.

According to the presently preferred embodiment of the invention assembly 12 further comprises an arrangement of electrode structures 14 for applying voltage across liquid crystal medium 22 thereby to select its absorption curve (hence also its absorbance coefficient). When medium 22 is in a transmissive mode (maximal absorbance coefficient for the mesopic spectrum being significantly lower than unity, e.g., 0.6 or lower), all spectra of incident light are reflected from reflective surface 26 substantially with no additional absorbance by medium 22. When medium 22 is in one of its translucent modes (maximal absorbance coefficient for the mesopic spectrum close to or equal to unity), medium 22 substantially absorbs the mesopic spectra of the light. As illustrated in FIG. 5b, the mesopic spectrum is substantially absorbed by an activated medium 22.

The overall reflectance of assembly 12 thus varies according to the state of the liquid crystal medium. A reduction of the reflectance of assembly 12 is perceived by the viewer as the dimming of mirror system 10, while an increment of the reflectance is perceived by the viewer as clearance of mirror system 10.

Assembly 12 is thus responsive to voltage, in that voltage applied across the assembly makes the liquid crystal medium translucent to a degree which depends on the level of voltage. In other words different applied voltage levels result in different reflectance levels of assembly 12. In various exemplary embodiments of the invention the arrangement of electrode structures comprises two electrode structures, 14a and 14b, respectively disposed on or close to front side 16 and a back side 18 of assembly 12. Depending on the shape of medium 22, electrode structures 14 can be planar or have a certain degree of curvature. One or more of electrode structures 14 is preferably made of a light transmissive material, such as, but not limited to, indium-tin-oxide and a composite thereof.

Electrode structure 14b, which is deposed on back side 18 of assembly 12 can be made semi-transmissive, non-transmissive or reflective as desired. For example, in one embodiment, electrode structure 14b preferably serves as a reflective layer thus can substitute reflective surface 26 of assembly 12. In this embodiment, electrode structure 14b can utilize a metallic material having both high reflectivity and high electrical conductivity. Representative materials for such a metallic material include, without limitation, silver or silver alloy such as silver-gold alloy, silver-platinum alloy, silver-palladium alloy and the like. Conversely, electrode structure 14a is preferably light transmissive hence can substitute transparent substrate 24 of assembly 12.

In various exemplary embodiments of the invention mirror system 10 further comprises an electronic circuitry 30 for varying a level of the voltage applied on assembly 12. Circuitry 30 also controls the rate at which the voltage is varied. In various exemplary embodiments of the invention circuitry 30 receives ambient light information and rear light information, and selects both the level of the voltage and its variation rate based on the ambient light information, the rear light information or a combination thereof. This can be achieved, for example, by incorporating a microprocessor in circuitry 30 and supplementing the microprocessor with a suitable algorithm which processes the light information and determines the desired level and variation rate of the voltage.

The light information is preferably collected and transmitted to circuitry 30 by an arrangement of light sensors. Thus, according to a preferred embodiment of the present invention mirror system 10 comprises an ambient light sensor 32 and a rear light sensor 34. Ambient light sensor 32 collects ambient light information from the environment and transmits the information to circuitry 30, substantially in real time.

As used herein "ambient light" refers to any light propagating in the environment, irrespectively whether said light impinges or not on mirror system 10. Preferably, the ambient light includes at least one light ray which does not have the potential to be reflected from assembly 12. In other words, the ambient light includes at least one light ray which does not impinge on front side 16 of assembly 12.

Several ambient light sensors can be employed for more accurate measurement of light characteristics. The ambient light sensor(s) can be mounted on the body of mirror system 10 or be placed in other nearby locations. For example, when mirror system 10 is a rearview mirror of a vehicle, the ambient light sensors can be mounted on selected parts of the vehicle, such as, but not limited to, the dashboard, side doors, glove compartment or engine hood of the vehicle. Circuitry 30 can also collect information from ambient light sensors mounted on other mirror systems of the same vehicle. Thus, when the vehicle has a one interior mirror system and two exterior mirror systems, the electronic circuitry of each mirror system can collect ambient light information from ambient light sensors of each and all mirror systems.

Rear light sensor 34 collects rear light information and transmits the information to circuitry 30 also substantially in real time.

As used herein "rear light" refers to light which can potentially be reflected from assembly 12. Thus, the rear light includes one or more light rays impinging on front side 16 of assembly 12. Typically, the rear light is originated from a bright or high intensity light source emitting light rays in the direction of mirror system 10 and generating a glare. Such glare can be generated by the headlights of a vehicle or another artificial light source. Glare can also be generated by direct sunlight (e.g., when the sun is close to the horizon).

Rear light sensor 34 is preferable mounted on or close to the front side 16 of assembly 12 so as to minimize sensation of undesired light rays. Nevertheless, even when ambient light rays are sensed by rear light sensor 34, the contribution of such sensation can be determined by the microprocessor of circuitry 30 which can be programmed to identify rapid changes of light characteristics (illuminance, brightness, hue, saturation) as rear light while rejecting other signals. Additionally or alternatively, the detection threshold of the rear light sensor 34 can be selected such that ambient light is not detected thereby.

Many types of light sensors are contemplated. Preferably, both ambient 32 and rear 34 light sensors operate within the typical ranges of temperature, humidity, shock and vibration experienced within or on the exterior of a vehicle's passenger compartment.

In one preferred embodiment, the light sensors are cadmium sulfide cells, which exhibiting increasing conductance with increasing light levels. Cadmium sulfide cells are known in the art and are found, e.g., in U.S. Pat. Nos. 4,086,101, 4,159,914 and 4,287,383, the contents of which are hereby incorporated by reference.

In another preferred embodiment, the light sensors are photodiodes, e.g., discrete photodiodes. Photodiodes are known in the art and are found, e.g., in U.S. Pat. Nos. 5,059,809, 5,117,118 and 5,936,231 the contents of which are hereby incorporated by reference.

In an additional preferred embodiment, the light sensors are integrated silicon chips incorporating a silicon-based light transducer and conditioning electronics. The chips generate charge at a rate proportional to the amount of incident light. The charge is collected over an integration period and the resulting potential indicates the level of light to which the sensor is exposed over the integration period. Suitable integrated silicon chips are found, for example, in U.S. Pat. Nos. 4,916,307, 5,214,274, 5,243,215, 5,338,691 and 5,789,737 the contents of which are hereby incorporated by reference.

When mirror system 10 is used as one of a vehicle's rearview mirrors. The driver uses mirror system 10 to view a rearward scene. Most of the time, the driver is looking forward through the windshield of the vehicle. The eyes of the driver therefore adjust to the ambient light coming from a generally forward direction. A relatively bright light source (e.g., from another vehicle or direct sunlight) in a rearward scene may produce light which can be reflected from mirror system 10 (either when serving as an interior rearview mirror or an exterior rearview mirror) to produce glare and temporarily visually impair, distract or dazzle the driver.

Ambient light sensor 32 senses the environmental light, preferably from a generally forward direction, and produces a signal (discrete or analog) indicating the amount of ambient light impinging on sensor 32. Similarly, rear light sensor 34 senses the rear light or glare from generally behind the vehicle, and produces a signal (again, discrete or analog) indicating the amount of rear light or glare.

To reduce the impact of the glare on the driver, the reflectance of liquid crystal reflective assembly 12 is preferably reduced by circuitry 30. Circuitry 30 receives the signals from the light sensors and controls the voltage across assembly 12. Specifically circuitry 30 selects the voltage and varies it at a predetermined rate, which rate is adapted to the light information. The light information can include any light characteristic including, without limitation, illuminance, brightness and/or spectrum.

As will be appreciated by one ordinarily skilled in the art, the brightness of the light is a measure of the light adjusted for the wavelength response of the human eye, so as to correspond to the subjective sensation of light by the physiological visual system. The illuminance of the light, on the other hand, can be defined as the power of light (integrated over the spectrum) per unit area. In SI units, the illuminance is expressed in units of lux.

The variation rate is preferably a decreasing function of the illuminance or brightness of the ambient and/or rear light. For example, for low ambient light (e.g., at night with minimal or no light sources) the variation rate is preferably high, and for high ambient light (e.g., at twilight or when the road is illuminated by street lights) the variation rate is preferably low. Additionally, the variation rate can be selected in accordance with a combination (e.g., a linear combination) of the ambient light and the rear light. Representative of such combination is, without limitation, a difference between the rear light and ambient light characteristics.

While the embodiments below are described with a particular emphasis to ambient light, it is to be understood that more detailed reference to ambient light is not to be interpreted as limiting the scope of the invention in any way. Specifically, any reference below to ambient light in conjunction to variation rate can be applied is to rear light or a suitable combination of ambient and rear light.

The advantage of using a variation rate which is a decreasing function of the brightness of the ambient light is that such rate mimics the response of the physiological visual system to light.

Figure 6:
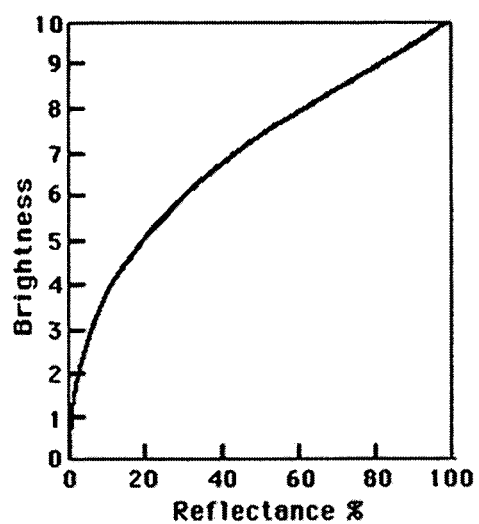
FIG. 6 shows a typical brightness curve as perceived by the physiological visual system from a reflective surface illuminated by constant illuminance, as a function of the reflectance of the surface.

FIG. 6 shows a typical brightness curve as perceived by the physiological visual system from a reflective surface illuminated by constant illuminance, as a function of the reflectance of the surface. In FIG. 6 the brightness is expressed in arbitrary units from 0 to 10 and the reflectance is expressed as percentage of the incident light energy. As shown in FIG. 6, the perceived brightness is not linearly proportional to the reflectance. There is an approximate logarithmic relationship between the lumens reflected from a reflective surface (or emitted by a light source). For example, for each doubling of the reflectance the perceived brightness is increased by about 1.5 units on the brightness scale.

As the derivative of a logarithmic function is inversely proportional to the argument of the function, the rate of change of perceived brightness is inversely proportional to the reflectance of the reflective surface. Thus, by changing the reflectance level of assembly 12 at a rate which is a decreasing function of the ambient illuminance or brightness, the present embodiments successfully mimic the response of the physiological visual system to light. It will be appreciated that such mimicry significantly improves the driver's comfort and reduces distraction resulting from the appearance of glare or unadjusted reduction of reflectance of the mirror.

The variation rate can be any decreasing function of the illuminance or brightness. For example, in one preferred embodiment, the variation rate is selected from a set of discrete rates, where each rate corresponds to a different illuminance or brightness. In another preferred embodiment, the variation rate is a monotonic function of the illuminance or brightness, such as, but not limited to, a reciprocal function or an exponentially decaying function.

The voltage across liquid crystal reflective assembly 12 can be varied either at a constant rate or at a time-dependent rate. In any event the rate is preferably, as stated, adapted to rear and ambient light characteristics. When a time-dependent variation rate is employed, either a continuous or step-wise time dependence can be employed. For example the variation rate can be gradually increased from very small variation to the appropriate level which is adapted to the ambient light conditions.

Circuitry 30 can also receive characteristic response information of the driver from a user interface and to use this information for weighting the appropriate variation rate. If desired, circuitry 30 can also use the characteristic response of the driver to select threshold values and/or corresponding reflectance levels of mirror system 10. Alternatively or additionally, the user can further adjust the threshold values and/or corresponding reflectance levels, to achieve optimal comfort.

Figure 7:
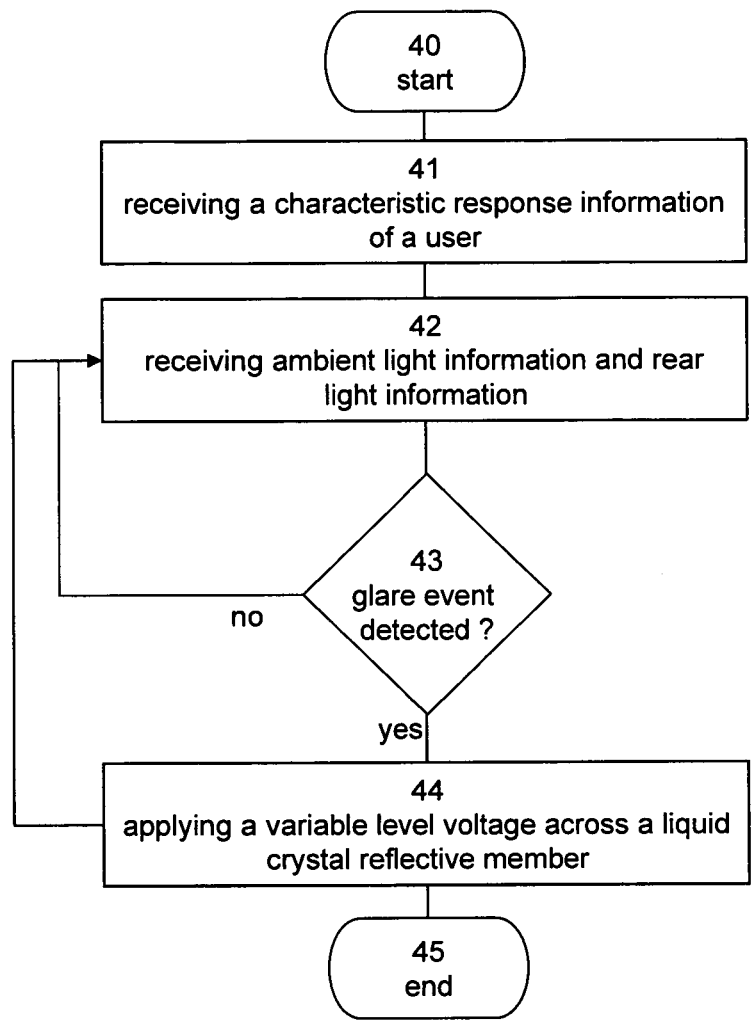
FIG. 7 is a flowchart diagram of a method suitable for dimming light reflected from a mirror, according to various exemplary embodiments of the invention.

Reference is now made to FIG. 7, which is a flowchart diagram of a method suitable for dimming light reflected from a mirror, according to various exemplary embodiments of the invention. The method begins at step 40 and, optionally and preferably continues to step 41 in which characteristic response information of the user is received. The method preferably continues to step 42 in which ambient and rear light information is received (e.g., from light sensors 32 and 34). The method proceeds to decision step 43 in which the method determine whether or not a glare event was occurred. This can be done by determining if the luminance of the rear light or the luminance difference between the rare and ambient light is above a predetermined threshold. Upon an identification of a glare event, the method continues to step 44 in which the voltage on a liquid crystal reflective assembly (e.g., assembly 12) is varied at a predetermined rate as further detailed hereinabove. The method can loop back to step 42 and repeat steps 42, 43 and 44 a plurality of times. The method ends, when desired, at step 45.

It is expected that during the life of this patent many relevant liquid crystal materials will be developed and the scope of the term liquid crystal reflective assembly is intended to include all such new technologies a priori.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

FIG. 8 is a diagram representing the variation rate of mirror system 10 for different ambient light conditions, according to a preferred embodiment of the present invention. Four discrete ambient light sectors are defined in the representative examples shown in FIG. 8. These light sectors appear on the top row of the diagram and are defined as follows: daylight (illuminance of about 20-10000 lux), twilight or light street illumination (about 5-20 lux), dark road with cars (about 1-5 lux), and complete darkness (less than about 1 lux).

The glare is shown in the second row of FIG. 8, for each ambient light sector. For example, for the twilight or light street illumination, three glare sectors are defined: (i) 2-86 lux, (ii) 0.5-2 lux, and (iii) below 2 lux.

The desired reflectance level of mirror 12 is shown in the third row of FIG. 8, for each ambient light sector and for each glare sector. Reflectance level designated "clear" represents a situation in which the mirror system is not dimmed. "Clear" reflectance can be, without limitation, about or above 50% reflectance level.

Referring, for example, to the twilight or light street illumination, the desired reflectance level is: less than 10% (e.g., about 5%) for the first glare sector, from 10% to 50% in the second glare sector, and clear in the third glare sector.

The variation rates for dimming mirror system 10 are shown in the fourth row and the variation rates for restoring the clear mode (or the mode immediately before the glare event) are shown in the fifth row.

The variation rates are expressed as combinations of time (seconds) and nonlinear reflectance-variation units, denoted in FIG. 8 and hereinafter by U. The nonlinear reflectance-variation are defined as follows: when the reflectance level of mirror 12 is about 50% a single reflectance-variation unit, U, corresponds to an reduction of the reflectance from about 50% to about 38%, when the reflectance level is about 38% a single unit corresponds to a reflectance reduction from about 38% to about 25%; when the reflectance level is about 25% a single unit corresponds to a reduction from about 25% to about 16%; when the reflectance is about 16% a single unit corresponds to a reduction from about 16% to about 10%; and when the reflectance level is about 10% a single unit corresponds to a reduction of the reflectance from about 10% to about 5%.

Referring, for example, to the fourth row of FIG. 8, in the twilight ambient light sector, upon a detection of a glare event of 2-86 lux, mirror system 10 preferably reduces its reflectance at a rate of one unit per 0.5 second. According to the above definitions of the absorption-variation unit, U, such rate corresponds to total dimming time of about 2.5 seconds as follows: (i) from t=0 to t=0.5 second, reduce reflectance to 38%, (ii) from t=0.5 second to t=1 second, reduce reflectance to 25%, (iii) from t=1 second to t=1.5 seconds, reduce reflectance to 16%, (iv) from t=1.5 seconds to t=2 seconds, reduce reflectance to 10%, and (v) from t=2 seconds to t=2.5 seconds, reduce reflectance to the desired level of 5%.

Similarly, upon a detection of a glare event of below 2 lux in the twilight ambient light sector, the reflectance is reduced at a rate of one unit per 1 second, corresponding to total dimming time of about 4 seconds (from t=0 to t=1 reduce the reflectance to 38%, from t=1 to t=2 reduce to 25%, from t=2 to t=3 reduce to 16%, and from t=3 to t=4 reduce the reflectance to 10%).

According to a preferred embodiment of the present invention the restoration of the reflectance (see the fifth row of FIG. 8) is done after a delay of about 2 seconds. Preferably, the restoration is performed at a rate of 1 unit per second, irrespectively of the ambient light.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A mirror system, comprising a spectrally selective liquid crystal reflective assembly having a transmissive liquid crystal medium that when activated, substantially partially absorbs light at wavelengths from about 490 nanometers to about 550 nanometers, while transmitting light at other wavelengths, resulting in the mirror system reflecting light at the other wavelengths,
   wherein said liquid crystal reflective assembly is responsive to a voltage such that when said voltage is applied across said liquid crystal reflective assembly, a reflectance level of said liquid crystal reflective assembly is altered,
   wherein said liquid crystal reflective assembly further comprises an electronic circuitry for varying a level of said voltage at a predetermined rate thereby altering a reflectance level of said liquid crystal reflective assembly at said predetermined rate,
   wherein said electronic circuitry is designed and configured to receive ambient light information and rear light information, and to select said level of said voltage and said predetermined rate based on said ambient light information, said rear light information or a combination thereof.

2. The system of claim 1, further comprising an ambient light sensor for collecting and transmitting said ambient light information to said electronic circuitry, and a rear light sensor for collecting and transmitting said rear light information to said electronic circuitry.

3. The system of claim 1, wherein said ambient light information and said rear light information each independently comprises light illuminance information.

4. The system of claim 1, wherein said ambient light information and said rear light information each independently comprises light brightness information.

5. The system of claim 1, wherein said ambient light information and said rear light information each independently comprises light spectral information.

6. The system of claim 1, further comprising a user interface communicating with said electronic circuitry.

7. The system of claim 6, wherein said electronic circuitry receives from said user interface a characteristic response information of a user to light and uses said characteristic response information to select or adjust a threshold value and corresponding reflectance level of said mirror system.

8. The system of claim 6, wherein said electronic circuitry is designed and configured to receive from said user interface a characteristic response information of a user to light and to select or adjust said predetermined rate based on said characteristic response information.

9. The system of claim 1, wherein said predetermined rate is selected from a set of discrete rates, each rate of said set of discrete rates corresponding to a different ambient light condition.

10. The system of claim 9, wherein each rate of said set of discrete rates corresponds to a different illuminance range, a different brightness range, or a different predominant wavelength range of said ambient light or said rear light, or both.

11. The system of claim 1, wherein said predetermined rate is a monotonic decreasing function of an illuminance of said ambient light or said rear light, or both.

12. The system of claim 1, wherein said predetermined rate is a monotonic decreasing function of a brightness of said ambient light or said rear light, or both.

13. The system of claim 1, wherein said predetermined rate is a non-monotonic function of a predominant wavelength of said ambient light or said rear light, or both.

14. The system of claim 1, wherein said electronic circuitry is designed and configured to vary said level of said voltage at a continuous or step-wise varying rate.

15. The system of claim 1, serving as a rearview mirror of a vehicle.

16. A mirror system, comprising a spectrally selective liquid crystal reflective assembly comprising a transmissive liquid crystal medium that preferentially absorbs light corresponding to mesopic conditions and reflects light at the non-absorbed wavelengths,
   wherein said liquid crystal reflective assembly is responsive to a voltage such that when said voltage is applied across said liquid crystal reflective assembly, a reflectance level of said liquid crystal reflective assembly is altered,
   wherein said liquid crystal reflective assembly further comprises an electronic circuitry for varying a level of said voltage at a predetermined rate thereby altering a reflectance level of said liquid crystal reflective assembly at said predetermined rate,
   wherein said electronic circuitry is designed and configured to receive ambient light information and rear light information, and to select said level of said voltage and said predetermined rate based on said ambient light information, said rear light information or a combination thereof.

17. The system of claim 16, wherein the liquid crystal medium is characterized by an absorption curve having a peak at a wavelength of 510-530 nanometers.

18. The system of claim 16, wherein the liquid crystal medium is characterized by an absorption curve having a peak at a wavelength of 510-530 nanometers and a half width at half max of about 50 nanometers.

19. The system of claim 16, wherein the liquid crystal medium is characterized by an absorption curve wherein light having a wavelength of about 490 to about 550 nm is preferentially absorbed more than light having a wavelength above 550 or below 490 nm.

20. The system of claim 16, further comprising an ambient light sensor for collecting and transmitting said ambient light information to said electronic circuitry, and a rear light sensor for collecting and transmitting said rear light information to said electronic circuitry.

21. The system of claim 20, further comprising a user interface communicating with said electronic circuitry.

22. The system of claim 21, wherein said electronic circuitry receives from said user interface a characteristic response information of a user to light and selects or adjusts said predetermined rate based on said characteristic response information.

23. The system of claim 22, wherein said predetermined rate is selected from a set of discrete rates, each rate of said set of discrete rates corresponding to a different ambient light condition.

24. The system of claim 23, wherein each rate of said set of discrete rates corresponds to a different illuminance range or brightness range of said ambient light or said rear light, or both.

25. The system of claim 23, wherein each rate of said set of discrete rates corresponds to a different predominant wavelength range of said ambient light or said rear light, or both.

26. The system of claim 20, wherein said electronic circuitry receives from said user interface a characteristic response information of a user to light and uses said characteristic response information to select or adjust a threshold value and corresponding reflectance level of said mirror system.

27. The system of claim 16, wherein said electronic circuitry varies said level of said voltage at a continuous or step-wise varying rate.

28. The system of claim 16, serving as a rearview mirror of a vehicle.

* * * * *